United States Patent [19]

Wood, Jr.

[11] Patent Number: 4,506,753
[45] Date of Patent: Mar. 26, 1985

[54] REMOVEABLE FORECAB FOR MOTORCYCLES

[76] Inventor: David D. Wood, Jr., 1402 Stout, Urbana, Ill. 61801

[21] Appl. No.: 273,090

[22] Filed: Jun. 12, 1981

[51] Int. Cl.³ .............................................. B62D 61/06
[52] U.S. Cl. .................................... 180/210; 280/276; 280/281 B
[58] Field of Search .................. 180/11, 210; 280/269, 280/282, 275, 276, 279, 280, 281 B

[56] References Cited

U.S. PATENT DOCUMENTS

| | | | |
|---|---|---|---|
| 1,092,910 | 4/1914 | Harley | 280/202 |
| 1,488,037 | 3/1924 | Fehr | 180/11 |
| 3,419,098 | 12/1968 | Mayers et al. | 180/11 |
| 3,610,358 | 10/1971 | Korff | 180/209 |

Primary Examiner—John A. Pekar

[57] ABSTRACT

Removeable cab for attachment to the front of a motorcycle having a telescoping tube front wheel, after removal of the front wheel, to produce a three-wheeled vehicle powered by the engine of the motorcycle, wherein the cab comprises an elongated housing providing a compartment for an operator of the three-wheeled vehicle, with the housing being provided with a pair of spaced wheels near its front, with connection elements including a pair of vertically inclined tubular members which fit into the suspension mounting brackets of the motorcycle, after removal of the front wheel and its fork tubes, to mount the cab onto the front of the motorcycle, and with control elements which cooperate with controls on the motorcycle to guide, throttle, clutch, shift gears, and brake the three-wheeled vehicle in a manner similar to normal motorcycle operation.

6 Claims, 10 Drawing Figures

U.S. Patent  Mar. 26, 1985  Sheet 2 of 2  4,506,753
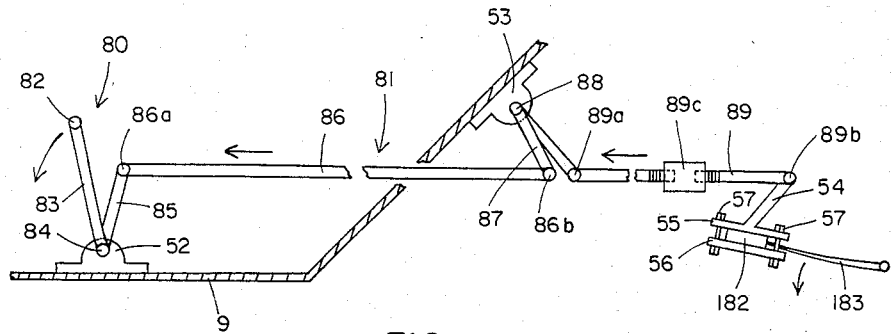
FIG. 5
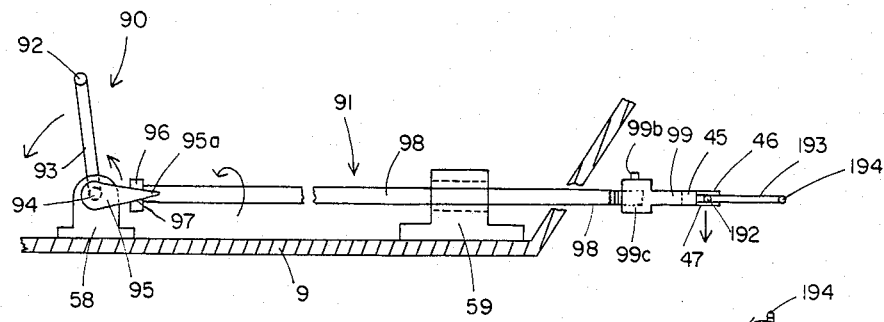
FIG. 6
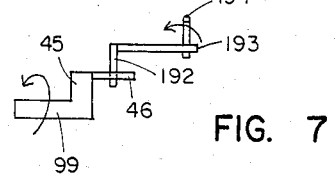
FIG. 7
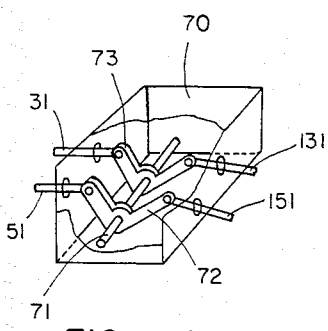
FIG. 8
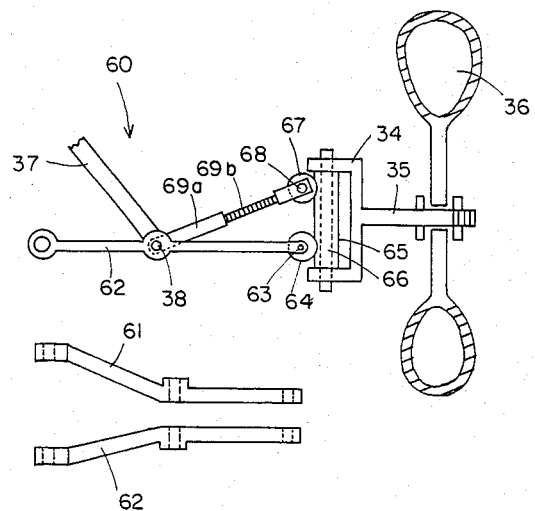
FIG. 9
FIG. 10

REMOVEABLE FORECAB FOR MOTORCYCLES

BACKGROUND OF THE INVENTION

This invention relates to a removeable forecab for motorcycles, and more particularly, to such a removeable forecab which is utilized to convert a motorcycle into an enclosed three-wheeled vehicle.

Motorcycles long have enjoyed popularity among younger persons as recreational vehicles. Moreover, sociological and economic trends, i.e., of postponed or foregone marriages, with consequently more single persons and smaller families, and higher fuel costs, respectively, have greatly increased the proportion of the over-all populace utilizing motorcycles not only for recreation, but as a primary mode of transportation.

The more widespread usage of motorcycles has amplified certain drawbacks characteristic of such vehicles, including limited stability, lack of protection in case of collision or even loss of control, inadequate provisions for baggage and additional passengers, and total exposure to weather conditions. In addition, it has become more commonly known that motorcycle riders undesireably suffer from crotch, bottom, and back discomfort, when it is attempted to travel continuously over any extended distance, due to vehicle vibration and road shocks.

To attempt to overcome or reduce some of the drawbacks common to normal motorcycle utilization, numerous types of open or closed forecabs previously have been suggested to be attached to the front of a motorcycle, with or without prior removal of the cycle's front wheel; such prior forecabs are exemplified by those shown in U.S. Pat. Nos. 1,092,910; 1,488,037; 3,419,098; and 3,610,358. Forecabs heretofore proposed, however, have not enjoyed any significant commercial success due to a failure to provide a suitable enclosed protective compartment, for failing to have versatility adapting them for use with cycles of differing designs and dimensions, for being too complicated and time-consuming in their attachment and detachment, and/or for being equipped with controls which are non-existent, inadequate, and/or confusing.

OBJECTS OF THE PRESENT INVENTION

Accordingly, it is the primary object of the present invention to provide an improved forecab for motorcycles.

Another object of the present invention is to provide an improved cab which may be attached to the front of a motorcycles and which advantageously is free of the shortcomings of cycle forecabs previously proposed.

An additional object of the present invention is to provide an improved forecab for motorcycles which advantageously provides a suitable enclosed compartment for its occupants.

A further object of the present invention is to provide an improved forecab for motorcycles which advantageously can be utilized to impart improved stability and passenger protection characteristics to motorcycles.

Still another object of the present invention is to provide an improved forecab for motorcycles which advantageously can be employed to enlarge the baggage and passenger accomodations of motorcycles.

Yet an additional object of the present invention is to provide an improved forecab for motorcycles which advantageously is versatile in its adaptability with cycles of differing designs and dimensions.

Another object of the present invention is to provide an improved forecab for motorcycles which advantageously is relatively simple and non-time-consuming in its attachment and detachment.

A still further object of the present invention is to provide an improved forecab for motorcycles which significantly is provided with controls in the driver-occupied portion of the enclosed compartment thereof which correspond to and are cooperatively connected with the normal controls of the cycle to which it is attached, advantageously eliminating any confusion as to the proper operation of the resultant combined three-wheeled vehicle.

A particular object of the present invention is to provide a cab which relatively simply and quickly can be attached to the front of a motorcycle to relatively inexpensively convert the the motorcycle into a three-wheeled vehicle retaining the basic desired qualities of a motorcycle but displaying improved stability, improved rider protection from spills, collisions, and weather, improved comfort for operators on extended trips, and expanded space for baggage and additional passengers, or, in short, cheaply convert (reversibly) a motorcycle into a still fun and fuel-efficient vehicle which is safer, more comfortable, and roomier.

DESCRIPTION OF THE ACCOMPANYING DRAWINGS

The above and other objects are achieved and are features of the removeable forecab of the present invention which will be described in greater detail hereinbelow with particular reference being made to the accompanying drawings in which:

FIG. 5 is a schematic side view illustrating a linkage in accordance with the present invention between the rear wheel brake of the motorcycle and the control means therefore in the forecab compartment;

FIG. 6 is similar to FIG. 5, excepting showing a linkage between the motorcycle transmission gear shift and the control means therefore in the forecab compartment; with FIG. 7 being an enlarged top view of the gear shift end of the linkage embodiment of FIG. 6;

FIG. 8 is an enlarged, partially broken away, perspective view of a connection box employed in the control means of the present forecab;

FIG. 9 is a schematic side view of an embodiment of the wheel suspension system utilized in the forecab of the present invention; and FIG. 10 is a top plan view of the main A-member provided in the suspension system shown in FIG. 9.

DESCRIPTION OF SPECIFIC EMBODIMENTS

Figure 1:
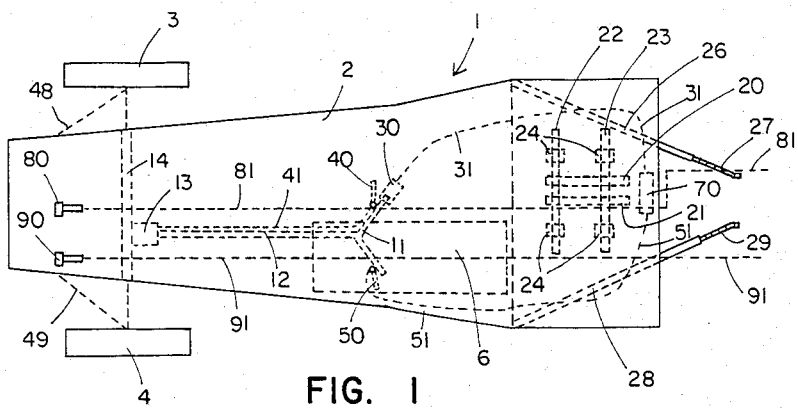
FIG. 1 is a schematic top view of an embodiment of the motorcycle forecab of the present invention.
Figure 2:
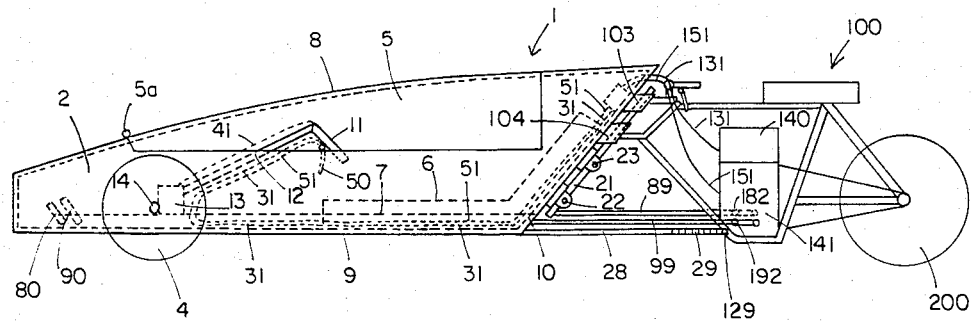
FIG. 2 is a schematic side view illustrating a three-wheeled vehicle provided by attaching an embodiment of the forecab of the present invention to a motorcycle.

With particular reference to the accompanying drawings in which like numerals refer to like elements, in FIGS. 1 and 2 numeral one generally designates a forecab of the present invention and numeral 100 generally designates a conventional motorcycle to the front of which, following removal of the front wheel, forecab 1 has been attached.

As shown, in accordance with the present invention, forecab 1 includes an elongated housing 2, formed by a generally flat floor board 9, a generally flat rear wall 10 that slopes upwardly and rearwardly from its junction with floor board 9, and a top 8, all joined to define therewithin an enclosed compartment for an operator of the vehicle formed by the combination of forecab 1 and motorcycle 100, with such operator being provided with a seat 6 and an openable and closeable access door 5 hingeably attached at 5a to housing 2 and, as shown, also forming the windshield of cab 1.

A pair of spaced wheels 3 and 4 are mounted forwardly of and each on an opposite side of housing 2, with wheels 3 and 4 having a common horizontal axis of rotation that is parallel to the axis of rotation of the rear wheel 200 of motorcycle 100.

Figure 4:
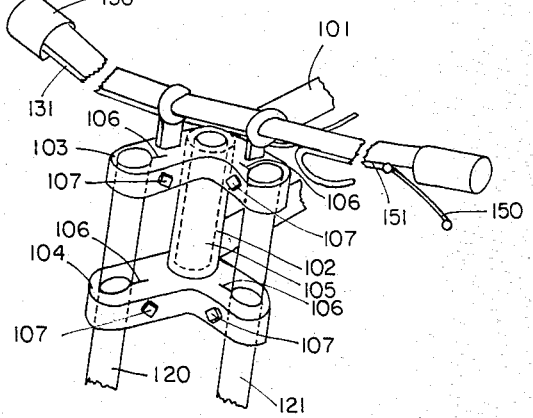
FIG. 4 is a partial view, partially broken away, illustrating the conventional telescoping tube front suspension mounting of a motorcycle utilized in attaching the forecab of the present invention and a portion of the conventional handlebar-mounted controls of the motorcycle.

In accordance with the present invention means is provided for mounting and attaching the rear of housing 2, i.e., at rear wall 10, to the front of the motorcycle 100. A special feature of the present invention is that such mounting and attachment is accomplished through the suspension mounting brackets conventionally located on the front of motorcycle 100. Such conventional telescoping tube arrangement, which is more fully shown in FIG. 4, includes a pair of suspension mounting brackets, i.e., upper bracket 103 and lower bracket 104, which are maintained in spaced relationship to one another by a tubular member 102 fixedly mounted therebetween, with tubular member 102 being slideably received within tubular member 105 from which the remainder of the main frame, e.g., frame tubular members 101, extend rearwardly in motorcycle, so that the assembly including brackets 103 and 104 and spacer tube 102 is free to rotate about the axis of tube 105 and provide the movement, in response to handlebars 131, through which motorcycle 100 normally is guided. The front wheel of motorcycle, not shown, normally is mounted to the front of motorcycle 100 by means of fork tubes 120 and 121 located on each side thereof and which are received within slotted openings 106 in each bracket 103 and 104 and maintained in place releaseably by fastening means, e.g., threaded bolts 107 which are cooperatively received within threaded openings in brackets 103, 104 to allow openings 106 to be tightened or loosened around fork tubes 120,121 in the anchoring and removal, respectively, of the latter.

In accordance with the present invention, for attachment of forecab 1 to motorcycle 100 to produce a three-wheeled vehicle, fork tubes 120,121 and the front wheel the same are connected to are initially removed from brackets 103,104 to ready triple trees 103, 104 for use in cooperatively mating with the motorcycle mounting and attaching means provided on housing 2.

Figure 3:
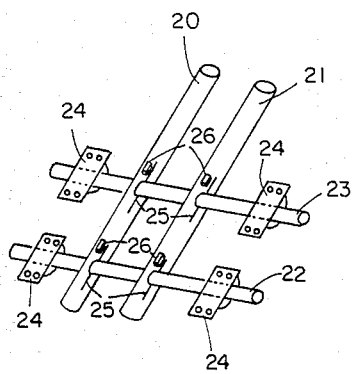
FIG. 3 is an enlarged view in perspective showing an embodiment of the adjustable attachment means utilized to mount the forecab of the present invention to a motorcycle.

Such mounting and attaching means, as more clearly shown in FIG. 3, includes a pair of spaced, vertically inclined tubular members 20 and 21 of such size and dimensions so to be adapted to be slideably received within brackets 103,104 and be thereby substituted for fork tubes 120 and 121 in releaseable, fixed engagement within brackets 103,104, upon proper adjustment of bracket fastening means, e.g., bolts 107. Tubular members 20,21 are provided with means so that the same may be fixedly positioned vertically and releaseably and adjustably, fixedly positioned horizontally with respect to the rear wall 10 of housing 2. In a preferred embodiment of the present housing, as shown in FIG. 3, such adjustment is accomplished by locating spaced, slotted openings 25 in each of tubular members 20,21, providing means, e.g., threaded bolts 26 which are received within threaded openings in members 20,21, to vary the size of openings 25, and positioning tubular members 20,21 on horizontal tubular elements 22 and 23 which are anchored to rear wall 10 of housing 2 by fastening means, e.g., bracket elements 24, with horizontal tubular elements 22,23 being received within slotted openings 25 and being of such a relative size with respect to such openings that tubular members 20,21 may be slideably moved therealong when elements 26 are loosened and may be fixed in position when elements 26 are tightened. This feature of the forecab of the present invention advantageously adapts forecab 1 to be attached, by an appropriate adjustment of the spacing between vertical tubular members 20,21, to a widely varying number of motorcycles and imparts a highly desirable versatility to the forecab of the present invention to be utilized with motorcycles of different sized suspension mounting brackets.

In accordance with the present invention, the housing mounting and attachment means provided also includes means for laterally stabilizing motorcycle 100 following positioning and anchoring of tubular members 20,21 within triple trees 103,104 so that forecab 1 is located at the desired height above the ground. Such lateral stabilizing means, in the more preferred embodiments of the present invention, is provided by a pair of rod elements 26 and 28 which extent diagonally and rearwardly from rear wall 10 of housing 2 and are adapted at their rear terminal ends, 27 and 29, respectively, with means, e.g., by ends 27 and 29 being adapted to threadedly telescope in and out of their respective parent rod elements 26 and 28, to adjust the length thereof in response to the obtaining dimensions of the particular motorcycle 100 to which forecab 1 is being attached. For convenience, the rear terminal ends of stabilizing rods 26,28 may be anchored to motorcycle by bolt means replacing a conventional footrest on the motorcycle, e.g., as at 129 shown in FIG. 2.

In accordance with the present invention, forecab is further provided with means, located within housing 2, for controlling the operation of the three-wheeled vehicle resulting from the combination of forecab 1 and motorcycle 100, as aforedescribed.

Such control means includes handlebar means 11 mounted on a post element 12 which is adapted, by means of a conventional linkage of post element 12 to wheels 3 and 4 through a gear mechanism, shown schematically as numeral 13, steering rods 14, and wheel support linkages, shown schematically as 48 and 49, respectively, to control the direction of travel of the three-wheeled vehicle.

The vehicle control means further includes a separate, hand-actuated means, each mounted on handlebar means for controlling the throttling and clutching of the engine 140 and transmission 141 of motorcycle 100.

Such throttling means includes a conventional twist-handle throttle 30 means mounted on handlebar means 11 and cooperatively communicating, through cable means 31 and a cable junction box means 70, located in housing 2, with cable means 131, the latter of which normally is connected to twist-handle throttle means 130 of motorcycle 100, but which is disconnected therefrom and connected to cable junction box means 70 in the mounting of forecab 1, as is shown in FIG. 8.

Similarly, such clutching means includes a conventional squeeze-grip bar element 50 mounted on handlebar means 11 and cooperatively communicating, through cable means 51 and cable junction box means 70, with cable means 151, the latter of which normally is connected to squeeze-grip clutch bar means 150 of motorcycle, but which is disconnected therefrom and connected to cable junction box means 70 in the attachment of forecab 1 to motorcycle 100, as shown in FIG. 8.

In cable junction box means 70, as shown in FIG. 8, movement is communicated between cables 31-131 and cables 51-151 by V-shaped elements 73 and 72, respectively, mounted pivotally on rod element 71 and to the respective ends of which cables 31,131 and 51,151 are releaseably connected by conventional means.

The control means in housing 2 further includes hand-actuated means mounted on handlebar means 11 for controlling the brakes of front wheels 3 and 4 of cab 1. As shown in FIGS. 1 and 2, such control means includes a conventional squeeze-grip bar means 40 mounted on handlebar means and cable means 41 connected thereto and cooperatively connected to the brakes of cab 1 in conventional manner for motorcycle squeeze-grip connections, not shown.

The housing 2 further includes control means for controlling each the braking and shifting of rear wheel 200 and transmission 141, respectively, of motorcycle 100.

Such rear brake control means is generally designated by numeral 80 and preferably includes a foot-actuated pedal means, e.g., pedal 82 which depends horizontally from vertically inclined support shaft 83, mounted adjacent floor 9 of housing 2 and cooperatively communicating through lever-rod linkage means, designated generally by numeral 81, with rear wheel brake pedal 182 on motorcycle. In a more preferred embodiment of the rear wheel brake linkage means of the present invention, shown in FIG. 5, housing pedal means 82-83 is connected through a splined shaft 84, mounted in a pillow block 52 on housing floor 9, to a bell crank 85, which in turn is connected to a first brake rod 86, the rear end of which extends out of housing 2. First brake rod 86 is connected to second brake rod 89, through a two-piece bell crank 87, the shaft of which is mounted in a pillow block 52 on housing rear wall 10. The rear end of second brake rod 89 is connected to a pedal adapter having a downwardly-forwardly inclined upper shaft 54 positioned on plate 55 to which a plate 56 is attached by means of bolts so that rear wheel brake pedal 182 of motorcycle 100 is anchored between plates 55,56. The connections of rods 86 and 89 at 86a, 86b, 89a, and 89b are through clevis ends thereof, so that upon a depression of pedal 82 in housing 2 by an operator of the device, in the direction of the arrow, as shown in FIG. 5, brake rods 86 and 89 are caused to move forwardly, and pedal adapter 54,55,56 is caused to move downwardly and thereby depress and actuate motorcycle rear brake pedal 182 and its mounting shaft 183.

In accordance with the present invention's more preferred embodiments, such control means 80 is further provided with means for adjusting the over-all length of linkage means 81, e.g., by breaking second rod 89 into two sections and locating therebetween a collar element 89c having an internally threaded opening into and out of which the threaded ends of the sections of rod 89 may be telescoped to vary the effective length of rod 89 and adapt linkage means 81 to the particular motorcycle 100 to which cab 1 is being attached.

Such transmission shifting control means is generally designated by numeral 90 and preferably includes a foot-actuated pedal means, e.g., pedal 92 which depends horizontally from vertically inclined support shaft 93, mounted adjacent floor 9 of housing 2 and cooperatively communicating through lever-rod linkage means, generally designated by numeral 91, with transmission shift pedal means 192 on motorcycle 100.

In a more preferred embodiment of the transmission clutch shift linkage means of the present invention, shown in FIG. 6, housing pedal means 92-93 is connected through a splined shaft 94, mounted in a pillow block 58 on housing floor 9, to a tear drop-shaped member 95 having a rearwardly extending pointed end 95a, with end 95a being fitted within laterally extending spaced prongs 96,97 located on the forward end of a first shift torque rod 98, so that upon the depression of pedal 92, by an operator of the device, the pointed end 95a is caused to move upwardly and, by forcing prongs 96,97 upwardly, causes torque rod 98 to rotate, as shown by the arrows in FIG. 6. First torque rod 98 is mounted in pillow block means, e.g., block 59, and the rear end thereof extends rearwardly out of housing 2 where it connects, through a length adjustment collar 99c, similar to collar 89c, to a second torque rod 99. The rear end of torque rod 99 has an inwardly extending lateral member 45 on which is positioned rearwardly extending spaced prong elements 46,47, the latter of which receive therebetween the horizontal transmission shift pedal means 192 of motorcycle 100, so that, upon pedal means 92,93 in housing 2 being depressed and torque rods 98,99 being rotated thereby, prong elements 46,47 are depressed and cause motorcycle shift pedal 192 to be depressed and actuated by rotation about its mounting shaft 194, as shown by the arrows in FIGS. 6 and 7.

By means of length adjustment means, e.g., adjustment collar 99c, being provided for linkage means 91, such linkage 91 advantageously may be varied to adapt linkage 91 to the particular motorcycle 100 to which cab 1 is being attached. Preferably, means, e.g., set screw pin 99b, is provided to anchor adjustment collar 99c or its equivalent in its adjusted desired position.

A further feature of the removeable forecab of the present invention is the provision of means for adjusting the chamber of cab wheels 3 and 4. In a preferred embodiment of such chamber adjustment means, shown in FIGS. 9 and 10, numeral 60 gererally designates such adjustment means, which includes an A-arm member formed by two spaced bar elements 61 and 62 having straight forward arms and slightly outwardly extending rear arms. A wheel, such as wheels 3 and 4, generally designated 36, mounted on a spindle 35 having an inwardly extending U-shaped portion 34, in the latter of which a kingpin sleeve 65 is mounted by a kingpin 66, is connected to A-arm member 61,62 at a lower flange 64 on kingpin sleeve 65 by a bolt means 63 which passes through the outside ends of arms 61 and 62 and flange 64, the latter of which is positioned between arms 61,62.

A variable length element consisting of cooperatively threaded rod sleeve 69a and rod 69b is attached at its inside end between and intermediate the ends of arms 61,61 and at its outside end to an upper flange 67 on kingpin sleeve 65 by bolt means 38 and 68, respectively. A coil-over shock absorber element 37 is attached at its lower end via bolt means 38 to A-arm member 61,62 and at its upper end to the housing 2, not shown, as are the inside ends of arms 61,62. By rotating rod 69b the camber of wheel 36 may be adjusted as desired for the particular motorcycle 100 to which cab 1 is being attached.

The present invention advantageously provides a removeable forecab for motorcycles which minimizes or totally eliminates the drawbacks attendant previous such forecabs. Importantly, the adjustable mounting tubular members 20 and 21 adapt the forecab of the present invention for use with any motorcycle having a telescoping tube for the front wheel suspension system, a feature further complimented by the adjustability of the linkage systems of the present cab. Moreover, the attachment and coupling means of the present forecab are simple to utilize and operate, requiring relatively little time and no special tools to accomplish attachment and detachment of the cab, an advantage further enhanced once the forecab is adjusted to fit a particular motorcycle.

A further special advantage of the forecab of the present invention is that, as will be noted, the controls in the forecab for the resultant three-wheeled vehicle produced by attaching cab 1 to motorcycle 100 are essentially the same and operate essentially the same as the original controls of the motorcycle. Accordingly, a motorcycle operator utilizing the present cab is not faced with becoming familiar with any dissimilar and/or confusing controls in order to operate the resultant three-wheeled vehicle.

Furthermore, the forecab of the present invention advantageously provides a simple and efficient means of improving the comfort and safety of motorcycles, and of providing increased passenger (another seat may be added next to operator seat 6) and baggage (space next to operator seat and space over lateral stabilizers 26 and 28 may be covered with storage pods, not shown) space.

What is claimed is:

1. In a removeable cab for attachment to the front of a motorcycle having a telescoping tube-mounted front wheel, after detachment of said motorcycle front wheel, to produce a three-wheeled vehicle powered by the engine of said motorcycle, the improvements comprising:
   (a) an elongated housing defining therewithin an openable, enclosed compartment for an operator of said three-wheeled vehicle,
   (b) a pair of spaced wheels mounted forwardly of and each on an opposite side of said housing, said pair of wheels having a common horizontal axis of rotation which is parallel to the axis of rotation of the rear wheel of said motorcycle,
   (c) means for mounting and attaching the rear of said housing to said front of said motorcycle, after removal from said motorcycle of said front wheel and the fork tubes supporting the same in suspension brackets of said motorcycle, said housing attaching means including a pair of spaced, vertically inclined tubular members of such dimensions to be adapted to be slideably received in releaseable, fixed engagement within said suspension brackets of said motorcycle, said housing attaching means further including means for anchoring said pair of tubular members so that said tubular members are fixedly positioned vertically and releaseably and adjustably, fixedly positioned horizontally with respect to said rear of said housing, and
   (d) means, located within said housing, for controlling said three-wheeled vehicle, including handlebar means for controlling the direction of travel of said vehicle, separate, hand-actuated means, each mounted on said handlebar means and cooperatively communicating through separate cable means with the respective controls on said motorcycle, for controlling each the throttling and clutching of said motorcycle engine and transmission, respectively, hand-actuated means, mounted on said handlebar means, for controlling the braking of said housing-mounted pair of wheels, and separate pedal-actuated means, each mounted adjacent the floor of said housing and cooperatively communicating through separate lever-rod linkage members with the respective pedal controls on said motorcycle, for controlling each the braking and shifting of said motorcycle rear wheel and transmission, respectively.

2. The removeable forecab according to claim 1 wherein said anchoring means for said vertically inclined tubular members of said housing mounting and attaching means includes a pair of spaced horizontal tubular members upon which said vertical tubular members are mounted through openings in said vertical tubular members in which horizontal tubular members are received, and said anchoring means further includes means for releaseably fixing the location of said vertical tubular members along the length of said horizontal tubular members.

3. The removeable forecab according to claim 1 wherein junction means is provided in said housing for connecting each the control cable means of said cab and said motorcycle for controlling the throttling and clutching of said motorcycle, respectively.

4. The removeable forecab according to claim 1 wherein said forecab is provided with means for adjusting the camber of said housing-mounted wheels.

5. The removeable forecab according to claim 1 wherein said forecab is provided with rearwardly extending lateral stabilizing members for attachment to said motorcycle, and said lever-rod linkage members of said control means and said stabilizing members are adjustable as to their over-all lengths, respectively.

6. A three-wheeled vehicle comprising a forecab according to claim 1 and a motorcycle to which said forecab is mounted through said mounting and attaching means of said forecab, after removal from said motorcycle of the front wheel-fork tube assembly from the mounting brackets thereof.

* * * * *